(12) United States Patent
Hagano

(10) Patent No.: US 10,434,874 B2
(45) Date of Patent: Oct. 8, 2019

(54) CLOSING DEVICE FOR FILLER PORT

(71) Applicant: TOYODA GOSEI CO., LTD., Kiyosu-shi, Aichi-ken (JP)

(72) Inventor: Hiroyuki Hagano, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 139 days.

(21) Appl. No.: 15/498,603

(22) Filed: Apr. 27, 2017

(65) Prior Publication Data
US 2017/0313178 A1 Nov. 2, 2017

(30) Foreign Application Priority Data
May 2, 2016 (JP) .................................. 2016-092248

(51) Int. Cl.
*B60K 15/05* (2006.01)
*B60K 15/04* (2006.01)

(52) U.S. Cl.
CPC .......... *B60K 15/05* (2013.01); *B60K 15/0406* (2013.01); *B60K 2015/0422* (2013.01); *B60K 2015/053* (2013.01); *B60K 2015/0515* (2013.01)

(58) Field of Classification Search
CPC ............... B60K 15/05; B60K 15/0406; B60K 2015/0422; B60K 2015/053; B60K 2015/0515
USPC ....................................................... 220/86.2
See application file for complete search history.

(56) References Cited

U.S. PATENT DOCUMENTS

2010/0012223 A1* 1/2010 Yoshida ............. B60K 15/0406
141/350
2014/0091095 A1 4/2014 Hagano et al.

FOREIGN PATENT DOCUMENTS

| EP | 1034959 A2 | 9/2000 |
|---|---|---|
| JP | 2010-023678 A | 2/2010 |
| JP | 2014-069618 A | 4/2014 |

OTHER PUBLICATIONS

Office Action dated Jan. 25, 2019 issued in corresponding CN patent application No. 201710294749.5 (and English translation).

* cited by examiner

*Primary Examiner* — Anthony D Stashick
*Assistant Examiner* — James M Van Buskirk
(74) *Attorney, Agent, or Firm* — Posz Law Group, PLC

(57) ABSTRACT

A closing device for a filler port comprises an inlet box configured to form the filler port; a lid configured to rotate about a first rotating shaft that is fixed to the inlet box, such as to open and close a surface of the inlet box; and a fuel passage-forming portion configured to form a fuel passage. The lid includes a plate-like lid main body portion configured to rotate about the first rotating shaft, and an open-close mechanism provided on an inner side of the lid main body portion as a separate body from the lid main body portion and configured to be rotatable about the first rotating shaft such as to open and close an opening. When the lid is opened from a closed position, the lid main body portion and the open-close mechanism are opened integrally. This configuration suppresses dirt or the like adhering to a surface of the open-close mechanism for the filler port from entering a fuel tank.

5 Claims, 3 Drawing Sheets

CLOSING DEVICE FOR FILLER PORT

CROSS-REFERENCE TO RELATED APPLICATION

The present application claims priority from Japanese patent application 2016-092248 filed on May 2, 2016, the entirety of the content of which is hereby incorporated by reference into this application.

BACKGROUND

Technical Field

The disclosure relates to technology regarding a closing device for a filler port.

Related Art

A closing device is provided at a filler port of a motor vehicle to close the filler port such as to prevent overflow of a liquid fuel stored in a fuel tank. The closing device for the filler port includes a lid that serves as an outer cover to separate the fuel tank from outside, and a filler neck that is placed on an inner side of the lid and is arranged to receive a fueling nozzle that is inserted to supply the liquid fuel. An open-close device for a fuel tank described in JP 2014-69618A describes an open-close member of a fuel passage that is rotated toward the fuel tank side to open when a fueling nozzle is inserted.

In the open-close device for the fuel tank described in JP 2014-69618A, when the fueling nozzle is inserted, the open-close member is rotated toward the fuel passage side, such as to open the opening of the fuel passage. There is accordingly a possibility that dirt or the like adhering to the surface of the open-close member enters the fuel passage.

SUMMARY

In order to solve at least part of the problems described above, the disclosure may be implemented by aspects or configurations described below.

(1) According to one aspect of the disclosure, there is provided a closing device for a filler port. This closing device for the filler port comprises an inlet box configured to form the filler port; a lid configured to rotate about a first rotating shaft that is fixed to the inlet box, such as to open and close a surface of the inlet box that is opposite to a leading end side of a fueling nozzle inserted into the closing device; and a fuel passage-forming portion configured to provide an opening on a fuel tank side of the inlet box and to form a fuel passage that is arranged to cause a liquid fuel supplied from the opening toward a fuel tank to pass through. The lid includes a plate-like lid main body portion configured to rotate about the first rotating shaft, and an open-close mechanism provided on an inner side of the lid main body portion as a separate body from the lid main body portion and configured to be rotatable about the first rotating shaft such as to open and close the opening. When the lid is opened from a closed position, the lid main body portion and the open-close mechanism are opened integrally. In the closing device for the filler port of this aspect, even when dirt or the like adheres to an outer circumferential surface of the open-close mechanism during fueling or the like, the configuration that the open-close mechanism is opened toward the upstream side suppresses the dirt adhering to the outer circumferential surface of the open-close mechanism from entering the fuel passage. The configuration of the closing device for the filler port of this aspect also enables the user who performs fueling to simultaneously open and close the open-close mechanism by simply opening and closing the lid. This configuration thus does not require the user to open and close the lid and the open-close mechanism separately. This accordingly improves the convenience of the user who performing fueling.

(2) In the closing device for the filler port of the above aspect, the inlet box may include a first engagement portion. The open-close mechanism may include an arm configured to be rotatable about the first rotating shaft, and a first cover portion configured to open and close the opening and provided with a second engagement portion configured to be engaged with the first engagement portion. The opening may be configured to be closed by the first cover portion when the first engagement portion and the second engagement portion are engaged with each other. The closing device for the filler port of this aspect provides the simple configuration that the open-close mechanism is opened and closed by simply opening and closing the lid.

(3) In the closing device for the filler port of the above aspect, the first cover portion may be configured to be detachably attached to the arm. The closing device for the filler port of this aspect does not require to close the open-close mechanism, in order to close the opening. This increases the number of options to close the opening and thereby improves the convenience of the user who performs fueling.

(4) In the closing device for the filler port of the above aspect, the inlet box may include a first engagement portion. The open-close mechanism may include an arm configured to be rotatable about the first rotating shaft, and a second cover portion configured to rotate about a second rotating shaft that is fixed to the inlet box, such as to open and close the opening and provided with a third engagement portion configured to be engaged with the first engagement portion. When the arm is closed from an opened position, the arm may be configured to come into contact with the second cover portion such as to rotate the second cover portion in a closing direction and such as to provide engagement of the first engagement portion with the third engagement portion, so that the opening is closed by the second cover portion. In the closing device for the filler port of this aspect, even when dirt or the like adheres to an outer circumferential surface of the open-close mechanism during fueling or the like, the configuration that the open-close mechanism is opened toward the upstream side suppresses the dirt adhering to the outer circumferential surface of the open-close mechanism from entering the fuel passage.

(5) In the closing device for the filler port of the above aspect, the first engagement portion may include a fixed portion that is fixed to the inlet box; an engagement rotating shaft that is fixed to the fixed portion; and a holding portion that is configured to rotate about the engagement rotating shaft and to be engaged with the second engagement portion. In the closing device for the filler port of this aspect, the rotatable holding portion of the first engagement portion is engaged with the second engagement portion.

(6) In the closing device for the filler port of the above aspect, the first cover portion may be made of rubber and may be deformable in a predetermined range. In the closing device for the filler port of this aspect, the first cover portion that is made of rubber is deformable in the predetermined range.

The present disclosure may be implemented by any of various aspects other than the closing device for the filler port described above, for example, a motor vehicle equipped with the closing device for the filler port or a manufacturing method of the closing device for the filler port.

Even when dirt or the like adheres to the upstream-side outer surface of the open-close mechanism during fueling or the like, the configuration that the open-close mechanism is opened toward the upstream side suppresses the dirt adhering to the outer surface of the open-close mechanism from entering the fuel passage.

DESCRIPTION OF EMBODIMENTS

Figure 1:
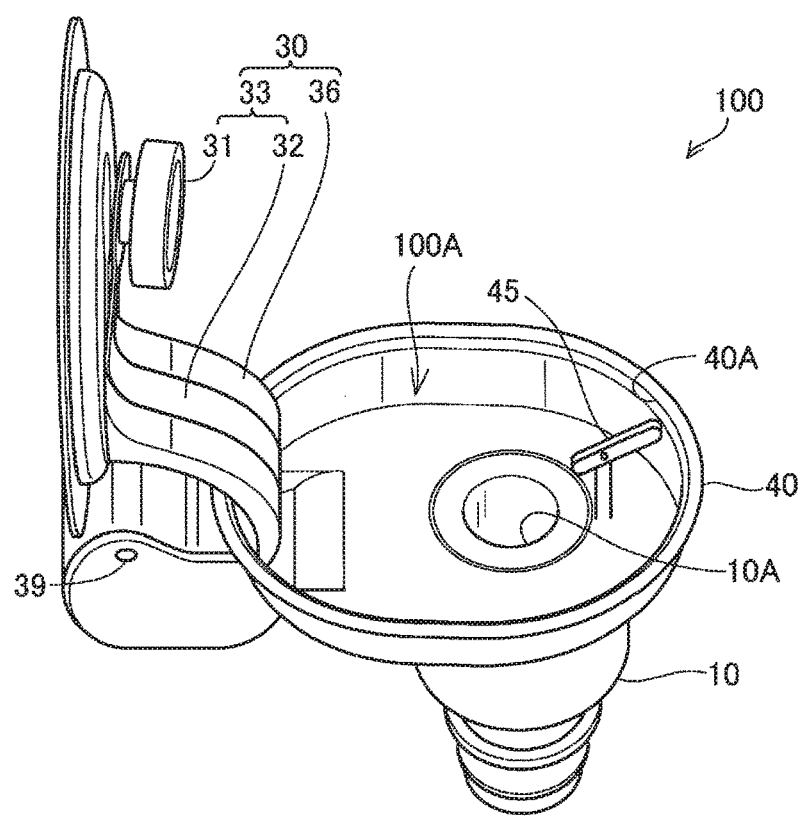
FIG. 1 is a perspective view illustrating a closing device for a filler port in the state that a lid is opened according to a first embodiment.

A. First Embodiment (1) General Configuration of Closing Device for Filler Port FIG. 1 is a perspective view illustrating a closing device 100 for a filler port 100A when a lid 30 is opened according to a first embodiment. The closing device 100 for the filler port 100A (in the description below, simply called "closing device 100") is mounted on a motor vehicle, and a fueling nozzle is inserted into the closing device 100 to supply a liquid fuel to a fuel tank of the motor vehicle. As shown in FIG. 1, the closing device 100 includes a fuel passage-forming portion 10, a lid 30 and an inlet box 40. The fuel passage-forming portion 10 is a tubular member configured to provide a first opening 10A which the fueling nozzle is inserted in and to form a fuel passage that is arranged to introduce the liquid fuel to the fuel tank. The first opening 10A corresponds to the opening portion in the claims.

The inlet box 40 serves to position the fuel passage-forming portion 10 relative to the motor vehicle. As shown in FIG. 1, the inlet box 40 is in a box-like shape having an elliptical cross section that is perpendicular to a direction of insertion of the fueling nozzle. The inlet box 40 is connected on its fuel tank side with the fuel passage-forming portion 10. The inlet box 40 includes a second opening 40A formed in a surface on an upstream side that is opposite to the fuel tank side. The inlet box 40 and the lid 30 are arranged to form the filler port 100A when the lid 30 is closed. The inlet box 40 includes a first engagement portion 45. The first engagement portion 45 is configured to fix the position of a first cover portion 31 (described later) relative to the inlet box 40. The detailed configuration of the first engagement portion 45 will be described later. In the description hereof, the fuel tank side is also called downstream side. In the description hereof, the upstream side denotes a front side (upper side on the sheet surface) along a longitudinal direction of the tubular fuel passage-forming portion 10 which the fueling nozzle is inserted in, with regard to the downstream side of the filler port 100A and denotes an outer surface side when the lid 30 is not closed, with regard to the upstream side of the filler port 100A. More specifically, the left side of FIG. 1 is called upstream side and the right side of FIG. 1 is called downstream side, with regard to the lid 30 that is opened as shown in FIG. 1.

The lid 30 is rotated about a first rotating shaft 39 provided at a fixed position relative to the inlet box 40. The lid 30 is configured to open and close a surface of the inlet box 40 on a base side of the fueling nozzle that is opposite to a leading end side of the fueling nozzle inserted into the filler port 100A. The lid 30 serves to protect the fuel passage-forming portion 10 when the lid 30 is rotated and closed. The lid 30 includes a plate-like lid main body portion 36 and an arm portion 33 placed inside of the lid main body portion 36. The lid main body portion 36 and the arm portion 33 are made of a resin material. The lid main body portion 36 and the arm portion 33 are configured to be separately rotatable about the first rotating shaft 39. The arm portion 33 includes an arm main body portion 32 configured to rotate about the first rotating shaft 39, and a first cover portion 31 attached to a free end side of the arm main body portion 32. The first cover portion 31 is configured to cover the first opening 10A when the arm main body portion 32 is fully rotated in the closing direction. The first cover portion 31 is made of rubber and is deformable in a predetermined range. The arm portion 33 corresponds to the open-close mechanism in the claims, and the arm main body portion 32 corresponds to the arm in the claims.

Figure 2:
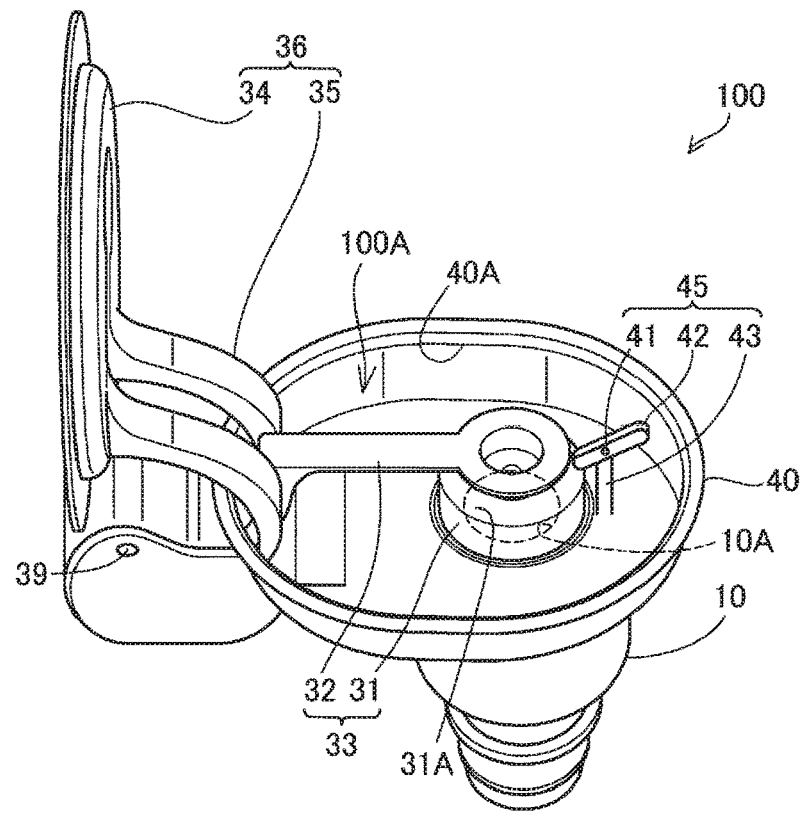
FIG. 2 is a perspective view illustrating the closing device when a lid main body portion is opened and an arm portion is closed.

(2) Details of Operations of Arm Portion 33 and First Engagement Portion 45 at Opening and Closing FIG. 2 is a perspective view illustrating the closing device 100 when the lid main body portion 36 is opened and the arm portion 33 is closed. As shown in FIG. 2, when the arm portion 33 is placed to close the first opening 10A, the first engagement portion 45 serves to fix the arm portion 33 in the closing direction. According to this embodiment, the first rotating shaft 39 is provided with a spring that is arranged to bias the arm portion 33 and the lid main body portion 36 in the opening direction. Accordingly the arm portion 33 is opened unless the first engagement portion 45 fixes the first cover portion 31 of the arm portion 33 at the closed position. In other words, the first opening 10A is closed by the first cover portion 31 through engagement of a surface 31A on the upstream side (in the description below, simply called "upstream side face 31A") of the first cover portion 31 with the first engagement portion 45. The upstream side face 31A of the first cover portion 31 corresponds to the second engagement portion in the claims.

The lid main body portion 36 includes a curved arm 35 and a lid cover 34. The lid cover 34 is configured to separate the filler port 100A from the atmosphere when the lid 30 is closed. The lid cover 34 has an elastic member that is provided on the downstream side to absorb a variation in the fitting position with the second opening 40A. The curved arm 35 is an arm that is curved and is used to rotate the lid cover 34.

The first engagement portion 45 includes a fixed portion 43 that is fixed to the inlet box 40, an engagement rotating shaft 41 that is fixed to the fixed portion 43, and a holding portion 42 that is rotated about the engagement rotating shaft 41. The engagement rotating shaft 41 is provided with a spring arranged to bias the first cover portion 31 in the closing direction toward the fuel tank side. An opposite end of the holding portion 42 that is not in contact with the first cover portion 31 (in the description below, called "outer circumferential side end") comes into contact with the lid cover 34 when the lid main body portion 36 is closed. When the lid cover 34 comes into contact with the outer circumferential side end of the holding portion 42, the lid cover 34 is rotated about the engagement rotating shaft 41 in an opening direction that is reverse to the closing direction, such as to release the first cover portion 31.

Figure 3:
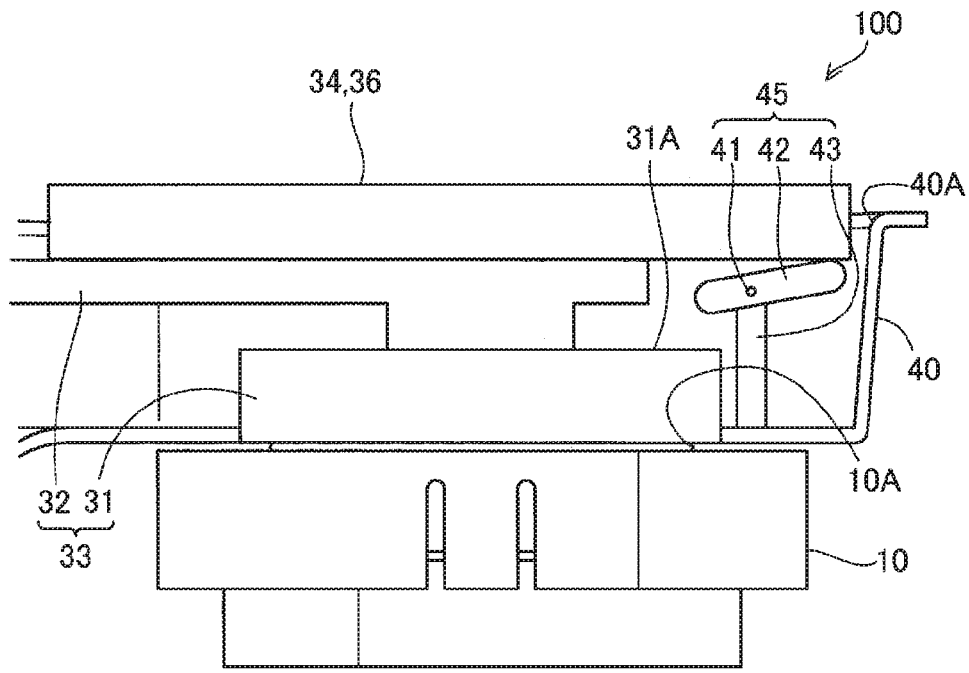
FIG. 3 is an enlarged sectional view illustrating the periphery of a first opening when both the arm portion and the lid main body portion are closed.

FIG. 3 is an enlarged sectional view illustrating the periphery of the first opening 10A when both the arm portion 33 and the lid main body portion 36 are closed. As shown in FIG. 3, when the lid main body portion 36 is closed in addition to the arm portion 33, an inlet box 40-side face of the lid cover 34 comes into contact with the outer circumferential side end of the holding portion 42, so that the holding portion 42 rotates about the engagement rotating shaft 41 in the opening direction. This changes the state of an end of the holding portion 42 (in the description below, called "inner circumferential side end") that is in contact with the upstream side face 31A of the first cover portion 31 when the lid main body portion 36 is opened, to the state that is not in contact with the upstream side face 31A. Accordingly, in the state that both the arm portion 33 and the lid main body portion 36 are closed, the arm 33 is biased in the closing direction only by the lid main body portion 36. When the lid 30 is placed to close the second opening 40A, the lid 30 is engaged with part of the inlet box 40 such as to maintain the closed state, although not being specifically illustrated.

According to this embodiment, the biasing force of the engagement rotating shaft 41 to bias the holding portion 42 in the closing direction is set to be smaller than the biasing force of the first rotating shaft 39 to bias the lid 30 in the opening direction. Accordingly, disengagement of the lid 30 from the inlet box 40 from the state that both the arm portion 33 and the lid main body portion 36 are closed as shown in FIG. 3 causes the arm portion 33 to be rotated in the opening direction by the biasing force of the first rotating shaft 39, before the inner circumferential side end of the holding portion 42 comes into contact with the upstream side face 31A of the first cover portion 31.

(3) Functions and Advantageous Effects at Opening and Closing of Lid

In the state that the lid 30 is closed, for example, when the motor vehicle is driven, the lid 30 is placed to close the filler port 100A, and the first cover portion 31 of the arm portion 33 is placed to close the first opening 10A, as shown in FIG. 3. In this state, the first cover portion 31 is biased in the closing direction by the lid cover 34 of the lid 30, while not being biased in the closing direction by the holding portion 42 of the first engagement portion 45. Accordingly when the lid 30 is opened from the closed position, the arm portion 33 and the lid main body portion 36 of the lid 30 are simultaneously opened to make the filler port 100A ready for insertion of the fueling nozzle as shown in FIG. 1.

When only the arm portion 33 is closed from the state that both the arm portion 33 and the lid main body portion 36 are opened as shown in FIG. 1, the upstream side face 31A of the first cover portion 31 receives the biasing force in the closing direction from the inner circumferential side end of the holding portion 42 of the first engagement portion 45 as shown in FIG. 2. The first cover portion 31 is pressed toward the downstream side by this biasing force such as to close the first opening 10A.

As described above, the arm portion 33 is opened and closed along with opening and closing of the lid 30 but may be rotated separately from the lid main body portion 36 to open and close the first opening 10A by, for example, the driver's manual operation. For example, in the case of high-pressure washing of the motor vehicle with the lid main body portion 36 at the opened position, the first opening 10A is closable by closing only the arm portion 33 while the lid main body portion 36 is kept at the opened position, as shown in FIG. 2.

As described above, in the closing device 100 for the filler port 100A according to this embodiment, the lid 30 includes the lid main body portion 36 configured to rotate about the first rotating shaft 39 such as to open and close the filler port 100A, and the arm portion 33 configured to be rotatable about the first rotating shaft 39 separately from the lid main body portion 36. When the lid 30 is opened from the closed position, the arm portion 33 and the lid main body portion 36 are integrally opened. The arm portion 33 is rotated about the first rotating shaft 39 to open and close the first opening 10A. Accordingly, in the closing device 100 for the filler port 100A according to this embodiment, even when dirt or the like adheres to the outer surface of the first cover portion 31 of the arm portion 33 during fueling or the like, the configuration that the arm portion 33 is rotated toward the upstream side to open suppresses the dirt adhering to the outer surface of the arm portion 33 from entering the fuel passage. In the closing device 100A for the filler port 100A of this embodiment, the arm portion 33 is configured to be rotated toward the upstream side to open. Compared with a configuration that the arm portion 33 is rotated toward the downstream side to open, this configuration does not require a space for placing the arm portion 33 rotated toward the downstream side to open. This accordingly ensures downsizing of the fuel passage-forming portion 10. Additionally, in the closing device 100 for the filler port 100A according to this embodiment, the arm portion 33 is opened and closed along with opening and closing of the lid main body portion 36. This configuration enables the user who performs fueling to simultaneously open and close the arm portion 33 by simply opening and closing the lid main body portion 36. This configuration thus does not require the user to open and close the lid main body portion 36 and the arm portion 33 separately. This accordingly improves the convenience of the user who performing fueling.

In the closing device 100 for the filler port 100A according to this embodiment, the first cover portion 31 is fixed at the closed position to close the first opening 10A through engagement of the first engagement portion 45 of the inlet box 40 with the upstream side face 31A of the first cover portion 31 placed on the free end side of the arm portion 31. Accordingly, this embodiment provides the simple configuration that the first cover portion 31 opens and closes the first opening 10A by simply opening and closing the arm portion 33 in the filler port 100A.

B. Second Embodiment

Figure 4:
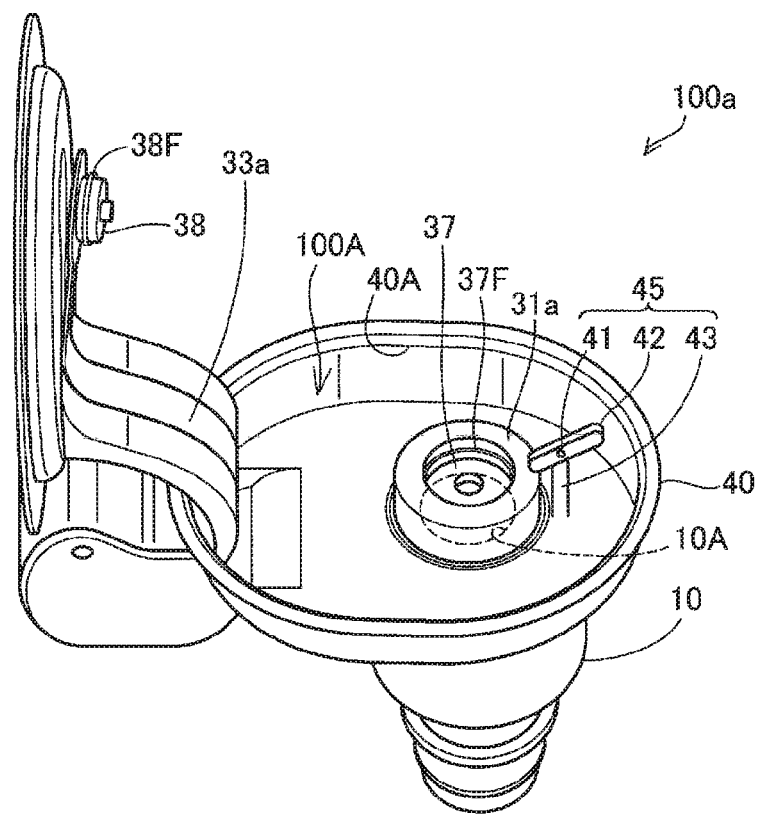
FIG. 4 is a perspective view illustrating a closing device according to a second embodiment in which a first cover portion is detached from an arm portion in the state that both the arm portion and a lid main body portion are opened.

FIG. 4 is a perspective view illustrating a closing device 100a according to a second embodiment in which a first cover portion 31a is detached from an arm portion 33a in the state that both the arm portion 33a and a lid main body portion 36 are opened. The closing device 100a of the second embodiment differs from the closing device 100 of the first embodiment by the configuration that the first cover portion 31a is detachably attached to the arm portion 33a, but otherwise has the same configuration and shape as those of the closing device 100 of the first embodiment. Accordingly the second embodiment mainly describes the details of only the first cover portion 31a that is detachably attached to the arm portion 33a, while not specifically describing the other configuration and shape.

The arm portion 33a includes an engagement projection 38 in a cylindrical shape that is provided on a free end side of the arm portion 33a and is configured to be engaged with the first cover portion 31a. A flange 38F is formed on part of the circumference of the engagement projection 38 to be protruded to the outer side in a radial direction from the remaining part. The first cover portion 31a includes an engagement recess 37 in a cylindrical shape that is configured to be engaged with the engagement projection 38. A circumferential concave 37F is formed on part of the circumference of the engagement recess 37 and is provided on the outer side in the radial direction to be engaged with the flange 38F. The first cover portion 31a is made of an elastic material to be deformable. The engagement projection 38 is accordingly attached to the engagement recess 37 by engagement of the flange 38F with the circumferential concave 37F.

As described above, in the closing device 100a according to the second embodiment, the first cover portion 31a is configured to be detachably attached to the arm portion 33a. There is accordingly no need to close the arm portion 33a, in order to close the first opening 10A. This configuration increases the number of options to close the first opening 10A and thereby improves the convenience of the user who performs fueling.

C. Third Embodiment

Figure 5:
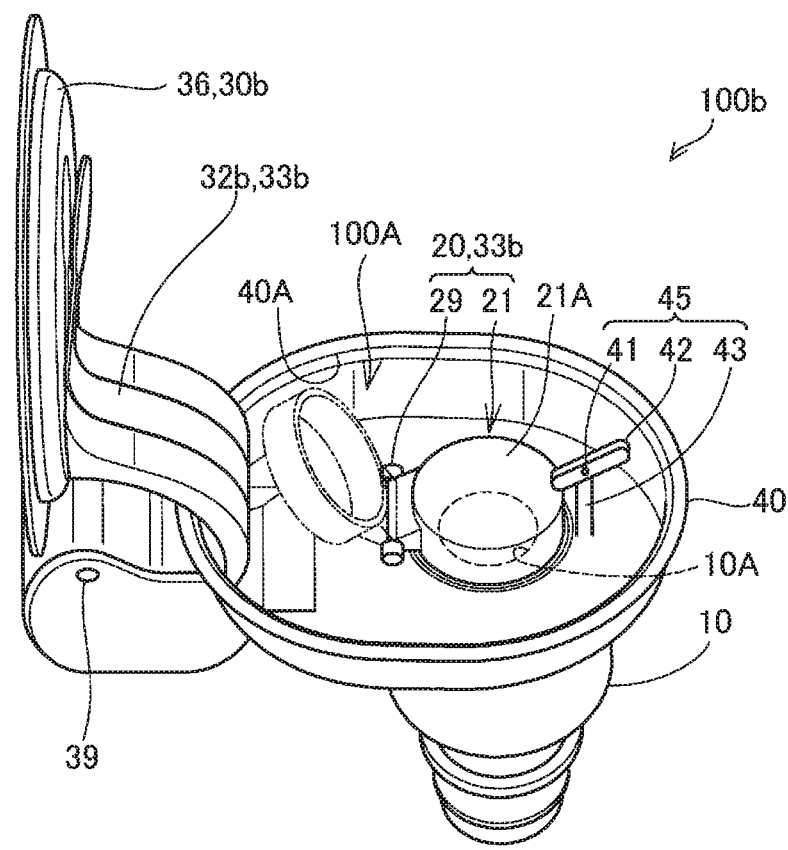
FIG. 5 is a perspective view illustrating a closing device configured to include a second cover portion according to a third embodiment.

FIG. 5 is a perspective view illustrating a closing device 100b configured to include a second cover portion 20 according to a third embodiment. The closing device 100b of the third embodiment differs from the closing device 100 of the first embodiment by the second cover portion 20 provided in place of the first cover portion 31, but otherwise has the same configuration and shape as those of the closing device 100 of the first embodiment. Accordingly the third embodiment mainly describes the second cover portion 20, while not specifically describing the other configuration and shape.

A lid 30b of the third embodiment is configured to include an arm main body portion 32b, a lid main body portion 36 and the second cover portion 20. The second cover portion 20 includes a second rotating shaft 29 provided at a fixed position relative to the inlet box 40, and a first opening cover 21 configured to rotate about the second rotating shaft 29 such as to open and close the first opening 10A. In FIG. 5, the state that the first opening cover 21 is closed is shown by the solid line, and the state that the first opening cover 21 is opened is shown by the two-dot chain line. The second rotating shaft 29 is placed between the first opening 10A and the first rotating shaft 39.

When the arm main body portion 32b is rotated from an opened position to a closed position in the state that the first opening cover 21 is opened, an upstream face 21A of the first opening cover 21 comes into contact with the arm main body portion 32b and receives a rotating force in a closing direction. Accordingly the first opening cover 21 is changed to the closed position, along with rotation of the arm main body portion 32b to the closed position. In this state, the upstream face 21A is engaged with a first engagement portion 45, and rotation of the first opening cover 21 is restricted by the first engagement portion 45. This changes the second cover portion 20 to the closed position. When the lid 30b including the second cover portion 20 is opened from the closed position, on the other hand, rotation of the second cover portion 20 is not restricted by the first engagement portion 45. This enables the second cover portion 20 and the lid main body portion 36 to be opened integrally. The upstream face 21A of the first opening cover 21 corresponds to the third engagement portion in the claims.

As described above, in the closing device 100b according to the third embodiment, the lid 30b includes the second cover portion 20. The second cover portion 20 is rotated about the second rotating shaft 29 that is fixed to the inlet box 40, such as to open and close the first opening 10A. The second cover portion 20 is integrally opened when the arm main body portion 32b and the lid main body portion 36 are opened. Accordingly, in the closing device 100b according to the third embodiment, even when dirt or the like adheres to the outer surface of the second cover portion 20 during fueling or the like, the configuration that the second cover portion 20 is rotated toward the upstream side to open suppresses the dirt adhering to the outer surface of the second cover portion 20 from entering the fuel passage.

D. Modifications

The disclosure is not limited to the above embodiments but may be implemented by any of various other aspects without departing from the scope of the disclosure. Some of possible modifications are given below.

The above embodiments describe some embodiments of the closing device for the filler port 100A. The configuration and the shape of the closing device may be changed and modified in any of various ways. For example, the inlet box 40 is not necessarily limited to the box-like member having the elliptical cross section but may be a member having a rectangular cross section or a member having a cross section of a complicated shape as combination of a plurality of different shapes. The inlet box 40 may have any configuration to provide the second opening 40A and form the filler port 100A.

The first embodiment and the second embodiment describe some examples of the configuration and shape for engagement of the first cover portion with the first engagement portion 45. The configuration and shape for engagement of the first cover portion with the first engagement portion 45 may be changed and modified in any of various ways. For example, the upstream side face 31A of the first cover portion 31 may be configured to include a convex or a concave for engagement with the first engagement portion 45. The configuration and shape of the first engagement portion 45 and the position of the first engagement portion 45 may be changed according to this modified configuration. According to the third embodiment described above, the second rotating shaft 29 that is the center of rotation of the second cover portion 20 is placed between the first opening 10A and the first rotating shaft 39. According to a modification, the second rotating shaft 29 may be placed on an opposite side to the first rotating shaft 39 across the first opening 10A.

In the above embodiments, the filler port 100A is defined as the space formed by the inlet box 40 and the lid 30. The definition of the filler port 100A may be changed and modified in any of various ways. For example, the first opening 10A may be defined as a filler port.

The disclosure is not limited to any of the embodiments, the examples, and the modifications described above but may be implemented by a diversity of other configurations without departing from the scope of the disclosure. For example, the technical features of any of the embodiments, the examples and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A closing device for a filler port, comprising:
an inlet box configured to form the filler port;
a lid configured to rotate about a first rotating shaft that is fixed to the inlet box, such as to open and close a surface of the inlet box that is opposite to a leading end side of a fueling nozzle inserted into the closing device; and
a fuel passage-forming portion configured to provide an opening on a fuel tank side of the inlet box and to form a fuel passage that is arranged to cause a liquid fuel supplied from the opening toward a fuel tank to pass through, wherein
the lid includes a plate-like lid main body portion configured to rotate about the first rotating shaft, and an open-close mechanism provided on an inner side of the lid main body portion as a separate body from the lid main body portion and configured to be rotatable about the first rotating shaft such as to open and close the opening, wherein
when the lid is opened from a closed position, the lid main body portion and the open-close mechanism are opened integrally,
wherein the inlet box includes a first engagement portion, and
the open-close mechanism includes an arm configured to be rotatable about the first rotating shaft, and a first cover portion configured to open and close the opening and provided with a second engagement portion configured to be engaged with the first engagement portion,
wherein
the opening is configured to be closed by the first cover portion when the first engagement portion and the second engagement portion are engaged with each other,
wherein the first engagement portion includes:
a fixed portion that is fixed to the inlet box;
an engagement rotating shaft that is fixed to the fixed portion; and
a holding portion that is configured to rotate about the engagement rotating shaft and to be engaged with the second engagement portion.

2. The closing device for the filler port according to claim 1,
wherein the first cover portion is configured to be detachably attached to the arm.

3. The closing device for the filler port according to claim 1,
wherein the first cover portion is made of rubber and is deformable in a predetermined range.

4. A closing device for a filler port, comprising:
an inlet box configured to form the filler port;
a lid configured to rotate about a first rotating shaft that is fixed to the inlet box, such as to open and close a surface of the inlet box that is opposite to a leading end side of a fueling nozzle inserted into the closing device; and
a fuel passage-forming portion configured to provide an opening on a fuel tank side of the inlet box and to form a fuel passage that is arranged to cause a liquid fuel supplied from the opening toward a fuel tank to pass through, wherein
the lid includes a plate-like lid main body portion configured to rotate about the first rotating shaft, and an open-close mechanism provided on an inner side of the lid main body portion as a separate body from the lid main body portion and configured to be rotatable about the first rotating shaft such as to open and close the opening, wherein
when the lid is opened from a closed position, the lid main body portion and the open-close mechanism are opened integrally,
wherein the inlet box includes a first engagement portion, and
the open-close mechanism includes an arm configured to be rotatable about the first rotating shaft, and a second cover portion configured to rotate about a second rotating shaft that is fixed to the inlet box, such as to open and close the opening and provided with a third engagement portion configured to be engaged with the first engagement portion, wherein
when the arm is closed from an opened position, the arm is configured to come into contact with the second cover portion such as to rotate the second cover portion in a closing direction and such as to provide engagement of the first engagement portion with the third engagement portion, so that the opening is closed by the second cover portion.

5. The closing device for the filler port according to claim 4,
wherein the first engagement portion includes:
a fixed portion that is fixed to the inlet box;
an engagement rotating shaft that is fixed to the fixed portion; and
a holding portion that is configured to rotate about the engagement rotating shaft and to be engaged with the second engagement portion.

* * * * *